United States Patent
Kimhi et al.

(10) Patent No.: US 11,093,611 B2
(45) Date of Patent: Aug. 17, 2021

(54) UTILIZATION OF DECEPTIVE DECOY ELEMENTS TO IDENTIFY DATA LEAKAGE PROCESSES INVOKED BY SUSPICIOUS ENTITIES

(71) Applicant: ITsMine Ltd., Hertzeliya (IL)

(72) Inventors: Kfir Kimhi, Herzliya (IL); Ran Norman, Rishon LeTsiyon (IL); Guy Ben Mayor, Rishon LeTsiyon (IL)

(73) Assignee: Itsmine LTD., Hertzeliya (IL)

( * ) Notice: Subject to any disclaimer, the term of this patent is extended or adjusted under 35 U.S.C. 154(b) by 251 days.

(21) Appl. No.: 16/017,267

(22) Filed: Jun. 25, 2018

(65) Prior Publication Data

US 2018/0373868 A1   Dec. 27, 2018

Related U.S. Application Data

(60) Provisional application No. 62/524,541, filed on Jun. 25, 2017.

(51) Int. Cl.
*H04L 29/06* (2006.01)
*G06F 21/55* (2013.01)
*G06F 21/62* (2013.01)

(52) U.S. Cl.
CPC ........ *G06F 21/556* (2013.01); *G06F 21/6218* (2013.01); *H04L 63/1491* (2013.01); *G06F 2221/034* (2013.01)

(58) Field of Classification Search
CPC ............. G06F 21/556; G06F 2221/034; G06F 21/6218; H04L 63/1491

USPC .......................................................... 726/23
See application file for complete search history.

(56) References Cited

U.S. PATENT DOCUMENTS

| | | | |
|---|---|---|---|
| 8,181,250 B2 | 5/2012 | Rafalovich et al. | |
| 8,677,484 B2 | 3/2014 | Munetoh et al. | |
| 8,683,589 B2 | 3/2014 | Munetoh et al. | |
| 9,009,829 B2 | 4/2015 | Stolfo et al. | |
| 9,553,885 B2 | 1/2017 | Touboul et al. | |
| 9,553,886 B2 | 1/2017 | Touboul et al. | |
| 2009/0328213 A1 | 12/2009 | Blake et al. | |
| 2016/0164894 A1 | 6/2016 | Zeitlin et al. | |
| 2016/0277444 A1 | 9/2016 | Keromytis et al. | |
| 2016/0359905 A1 | 12/2016 | Touboul et al. | |
| 2017/0093910 A1 | 3/2017 | Gukal et al. | |
| 2017/0134421 A1 | 5/2017 | Touboul et al. | |
| 2017/0134423 A1 * | 5/2017 | Sysman | G06F 21/554 |
| 2017/0142155 A1 | 5/2017 | Tasiemski et al. | |
| 2017/0163682 A1 | 6/2017 | Yu | |
| 2017/0277901 A1 * | 9/2017 | Hofleitner | F42D 3/00 |

* cited by examiner

*Primary Examiner* — Evans Desrosiers
(74) *Attorney, Agent, or Firm* — M&B IP Analysts, LLC

(57) ABSTRACT

A method and system for the deployment of deceptive decoy elements in a computerized environment to identify data leakage processes invoked by suspicious entities are presented. The method includes generating at least one deceptive decoy element; and deploying the generated at least one deceptive decoy element in a folder in a file system of the computerized environment, wherein the deployment is based on a sensitivity level of the folder, wherein the at least one deceptive decoy element is configured to provide an indication of unauthorized access upon an attempt by an unauthorized entity to access the folder.

14 Claims, 4 Drawing Sheets

UTILIZATION OF DECEPTIVE DECOY ELEMENTS TO IDENTIFY DATA LEAKAGE PROCESSES INVOKED BY SUSPICIOUS ENTITIES

CROSS-REFERENCE TO RELATED APPLICATIONS

This application claims the benefit of U.S. Patent Application No. 62/524,541 filed on Jun. 25, 2017, the contents of which are hereby incorporated by reference.

TECHNICAL FIELD

The present disclosure generally relates to data security, and more specifically, to a system and method for deployment of deceptive decoy elements in a computer-based system.

BACKGROUND

Enterprises all over the world hold sensitive and confidential information related to their business, employees and clients. The information is sometimes stored in simple folders in a computerized environment such as an enterprise network. In some countries, a data breach that occurs in an enterprise database, network, etc., may lead to a financial penalty. Moreover, the enterprise may be perceived as vulnerable, and clients and partners may not want to cooperate with a vulnerable enterprise.

Therefore, enterprises usually use many kinds of software to prevent data leakages and similar incidents. A common solution is the data leakage prevention (DLP) system also known as data loss prevention. DLP software detects potential data breaches and prevents them by monitoring, detecting and blocking sensitive. In data leakage incidents, sensitive data is disclosed to unauthorized parties by either malicious intent or an inadvertent mistake. Sensitive data includes private or enterprise information, intellectual property (IP), financial or patient information, credit-card data, etc.

One disadvantage of the existing solutions for handling data breaches is that it requires cooperation with business units owners and departments in the enterprise for adapting the DLP system to the enterprise policy. Another disadvantage of the DLP system is that it requires a lot of resources in order to maintain its functionality. In addition, the DLP systems usually interrupt employees' daily work. Another disadvantage of the DLP systems is that the integration of these systems usually takes several months, which expose the enterprise without protection against data threats during this period.

It would be advantageous to provide a solution that overcomes the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include method and system for the deployment of deceptive decoy elements in a computerized environment to identify data leakage processes invoked by suspicious entities. The method comprises generating at least one deceptive decoy element; and deploying the generated at least one deceptive decoy element in a folder in a file system of the computerized environment, wherein the deployment is based on a sensitivity level of the folder, wherein the at least one deceptive decoy element is configured to provide an indication of unauthorized access upon an attempt by an unauthorized entity to access the folder.

BRIEF DESCRIPTION OF THE DRAWINGS

The subject matter that is regarded as the disclosure is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION

Figure 1:
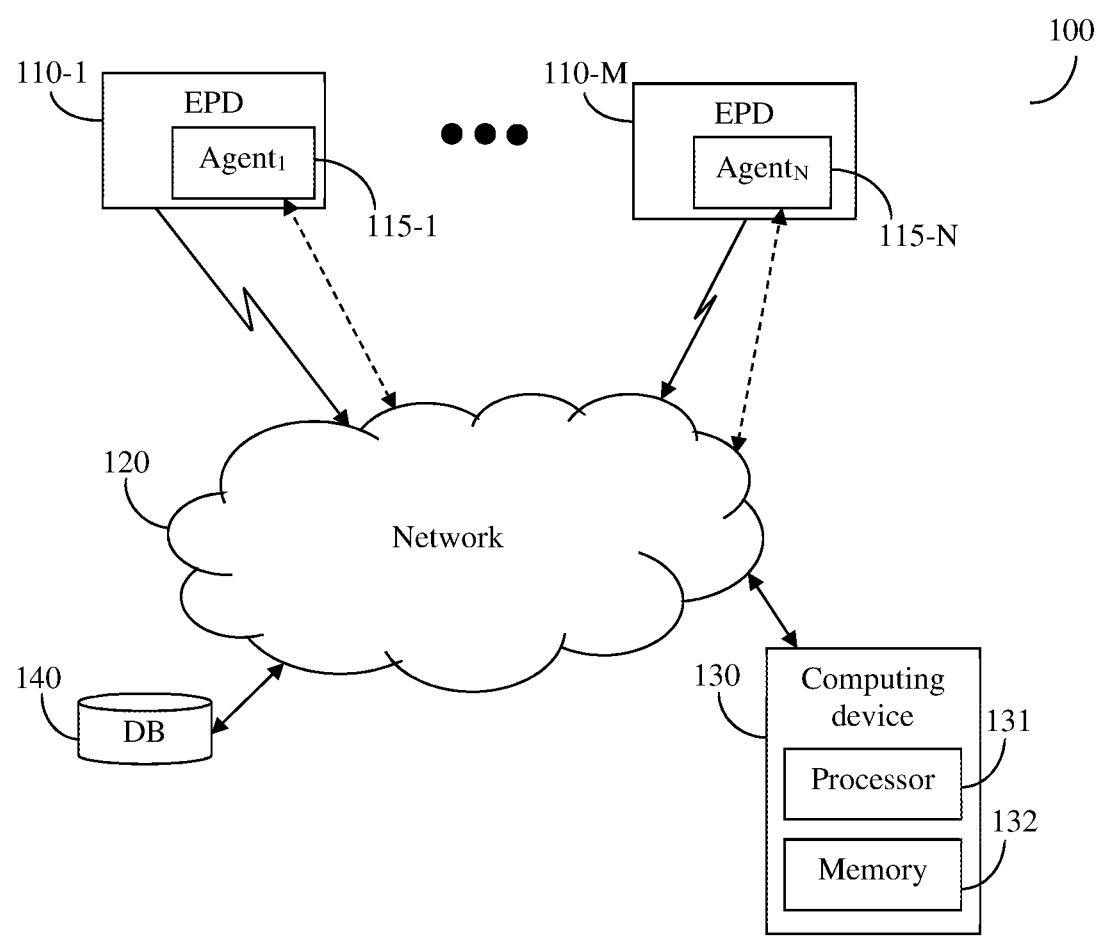
FIG. 1 is a network diagram utilized to describe various disclosed embodiments.

It is important to note that the embodiments disclosed by the present disclosure are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system for deployment of deceptive decoy elements in a computerized environment for data leakage prevention is disclosed. The generation of the deceptive decoy elements is achieved following identification of properties (such as type, size, title, location, etc.) of files stored in at least a folder in the computerized environment. The system analyzes the properties and generates at least one deceptive decoy element based on the analysis. The at least one deceptive decoy element is designed to provide an electronic indication of unauthorized access upon an attempt to be handled by an unauthorized entity. In an embodiment, the system analyzes the collected information for deploying the at least one deceptive decoy element in the at least a folder based on a sensitivity level of the folder.

FIG. 1 depicts a network diagram 100 utilized to describe various disclosed embodiments. A network 120 is used to enable communication between the different components of the network diagram 100. The network 120 may be, but is not limited to, a local area network (LAN), a wide area network (WAN), a metro area network (MAN), the world wide web (WWW), the Internet, a wired network, a wireless network, and the like, as well as any combination thereof.

A plurality of end point devices (EPD) 110-1 through 110-M, where M is an integer equal to or greater than 1, are communicatively connected to the network 120. The EPDs 110 can be, but are not limited to, smart phones, mobile phones, laptops, tablet computers, wearable computing devices, personal computers (PCs), a combination thereof and the like. A plurality of agents 115-1 through 115-N may be installed on the respective EPDs 110, and may be further connected to the network 120.

A computing device 130 is further connected to the network 120. The computing device 130 may be configured to execute predetermined computing tasks. The computing device 130 includes a processing circuitry 131 and a memory 132.

The processing circuitry 131 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 132 may be a volatile memory such as, but not limited to, Random Access Memory (RAM). In an embodiment, the memory 132 is configured to store software for execution by the processing circuitry 131. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 131 to perform the various processes described herein and, in particular, configure the system to provide a transaction manager that acts in accordance with one or more of the disclosed embodiments.

A database 140 may also be connected to the network 120. The database 140 is configured to store, for example, data related to previous deceptive decoy elements that were generated by the computing device 130.

According to an embodiment, the computing device 130 is configured to generate at least one deceptive decoy element. The at least one deceptive decoy element is at least a data element, such as a data file, that is designed to simulate a regular data element, e.g. a data file. However, the deceptive decoy element does not include any confidential or necessary information. The deceptive decoy element is placed in the folder of a file system of the computerized environment and is configured to provide an electronic indication of unauthorized access upon an attempt to be handled by an unauthorized entity.

Specifically, a deceptive decoy element may include an identifier by which the computing device is able to determine (or receive an indication of) whether, for example, an employee or an external attacker has opened the deceptive decoy element. The indication of unauthorized access may include, for example, the identity of the entity, the path made until opening the deceptive decoy element (e.g., whether the employee opened 3 folders until he reached the folder that stores the deceptive decoy element), and the like.

The folder may contain data associated with different matters such as, finance, marketing, human resources, and the like, that may include sensitive information that should be protected against data threats. The computerized environment may include, for example, a plurality of EPDs 110 communicatively connected by an enterprise network. Each one of the EPD 110 may be able to access the folder. Thus, the disclosed embodiments provide protection for information stored in the computerized environment.

In order to generate the deceptive decoy element, the computing device 130 is configured to collect information corresponding to the folder of the file system of the computerized environment. The information may refer to the folder's content (e.g., files), and may include the files' names, creation date, date modified, size, type, language, amount, and so on. For example, a folder associated with an enterprise finance department may contain 700 files that have similar properties that may indicate that all of the files were created during the same year, the files' average size is 215 kilobytes (KB).

The computing device 130 may be configured to analyze the information associated with the folder in order to determine the properties of the folder. The analysis may include calculating the files' size for identifying the files' average size, comparing the filenames to a set of predetermined keywords that enable categorization of each of the folder, etc.

The computing device 130 is configured to generate a deceptive decoy based on the determination of the folder's properties. For example, the computing device 130 may determine that a certain folder contains 200 PDF files having an average size of 1,045 KB, created in 2017, having keywords related to marketing. Then, the computing device 130 is configured to generate 60 deceptive decoy elements. According to the same example, one of the 60 deceptive decoy elements may be a 1,015 KB PDF file, having keywords relate to marketing, having a creation date from 2017, etc.

The computing device 130 is further configured to deploy the generated at least one deceptive decoy element in the folder. The deployment is based on a sensitivity level of the folder. For example, upon determination that a certain folder includes a low value information, the computing device 130 may deploy 0-10% of deceptive decoy elements within the folder, which is a low risk folder. According to the same example, in case the folder includes a medium value information, the computing device 130 may deploy 10-30% of deceptive decoy elements, and in case the folder includes a high value information, the computing device 130 may deploy 30-50% of deceptive decoy elements.

In order to determine the sensitivity level of the folder, the computing device 130 is configured to collect information related to the folder and analyze the information for determining the sensitivity level of the folder. The analysis of the information may include checking whether one or more items exist in the information, such as a certain keyword, identifiers, etc., that indicate that the folder contains confidential or restricted information. The analysis may further include checking the identity of the entity that handled the files related to the folder, checking how this entity reached the folder, whether the entity is a user or a computer, etc. In addition, the analysis may further include checking whether one or more parameters in the folder have exceeded a predetermined value, for example, in case there are more than two social security numbers stored therein, the folder may be categorized as a high-risk folder.

In an embodiment, the computing device 130 may be configured to constantly monitor the information corresponding to the folder for determining whether changes have occurred within the folder. For example, a folder categorized as a low risk folder on a certain date may be categorized as high-risk folder, i.e., containing high value information, on the following day. The reasons for such a change may be the addition of one or more confidential files to the folder, the identity of the entities that handled the folder between these days, etc.

In an embodiment, based on the determination that a change that requires a different sensitivity level has occurred, the computing device 130 may update the sensitivity level of the folder. According to a further embodiment, the computing device 130 updates the deployment of the at least one deceptive decoy element based on the updated sensitivity level of the folder. For example, in case a low risk folder contains 1% of deceptive decoy elements, after the sensitivity level increases and is updated respectively, the computing device 130 may deploy 25% of deceptive decoy elements in the folder. According to another embodiment, the deployment of the deceptive decoy elements may be executed on computer-based local systems, computer-based cloud systems, such as Microsoft® One Drive, Google® Docs, etc., and on structured data environment such as enterprise resource planning (ERP) systems.

Figure 2:
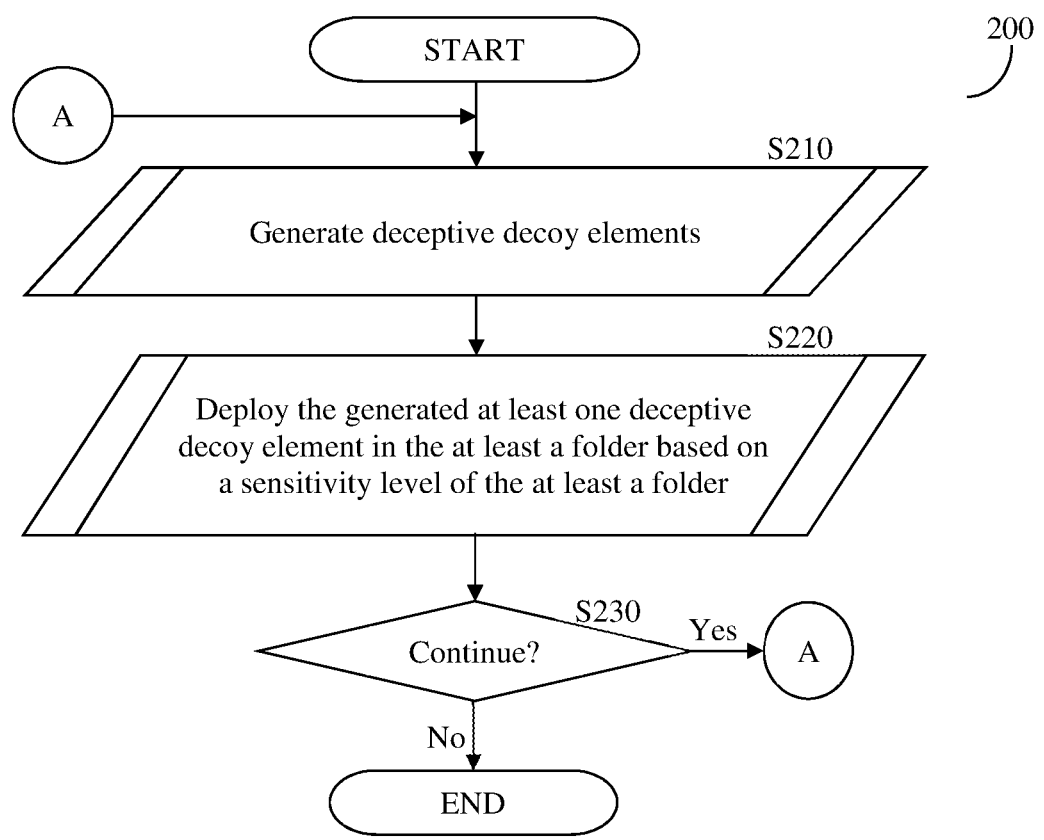
FIG. 2 is a flowchart illustrating a method for deployment of deceptive decoy elements in a computerized environment according to an embodiment.

FIG. 2 is an example flowchart 200 describing a method for deployment of deceptive decoy elements in a computerized environment according to an embodiment. At S210, one or more deceptive decoy elements is generated. Each deceptive decoy element is a data element placed in a folder of a file system of the computerized environment. The deceptive decoy element provides an electronic indication of unauthorized access upon an attempt to be handled by an unauthorized entity as further described herein above with respect of FIG. 1. The process of generating a deceptive decoy element is further described with respect to FIG. 1 and FIG. 3.

In an embodiment, the deceptive decoy element is a data element. The data element may be an electronic file that is designed to simulate a regular file. However, the deceptive decoy element, does not include any confidential or necessary information. The data element, i.e., the file, may be generated with respect to the other real files that are stored in the folder. Thus, the name of the data element may be similar to the real files in the same folder, the content of the data element may be generated by the system such that it will have the same template as at least part of the files in the folder and may be readable but will not contain important or confidential data. In an embodiment, the content may be destroyed or scrambled if the system is not configured to generate such a file.

At S220, the generated deceptive decoy element is deployed in the folder. In an embodiment, the deployment is based on a sensitivity level of the folder. The sensitivity level provides an indication of the folders' content value as further described herein above with respect of FIG. 1. The process of deploying the generated at least one deceptive decoy element in the folder is further described with respect of FIG. 1 and FIG. 4. At S230, it is checked whether to continue the operation and if so execution continues with S210; otherwise, execution terminates.

Figure 3:
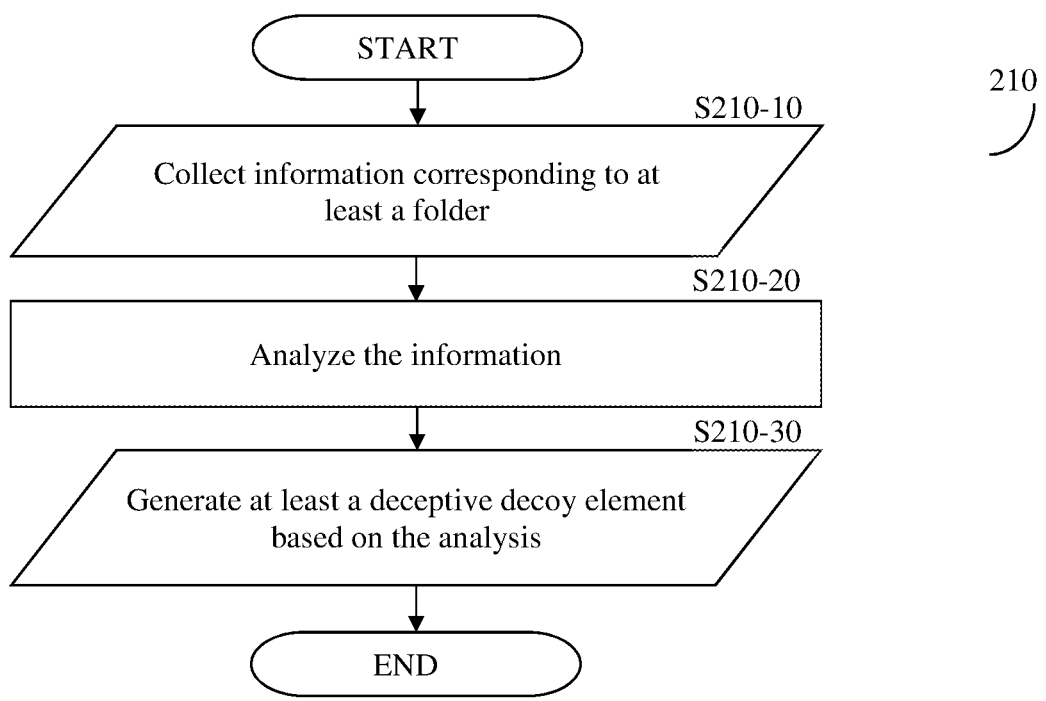
FIG. 3 is a flowchart illustrating a process for generating deceptive decoy elements according to an embodiment.

FIG. 3 is an example flowchart 210 describing a method for generating deceptive decoy elements according to an embodiment. At S210-10, information related to a folder of the file system of the computerized environment (e.g., end-unit) is collected.

At S210-20, the collected information is analyzed. The analysis may include comparing each of the files stored in the folder to a plurality of other files stored in the folder for determining the average size of the files stored in the folder, the files' estimated creation time, and so on. The analysis may further include comparing the filenames to a plurality of keywords stored in an index for categorizing the folder. For example, a folder contains 90 files named "revenues 2017", "expenses", "dividends", and the like may be compared to a plurality of keywords stored in an index, wherein, based on the comparison to the index, the folder may be identified as a folder related to a finance department. At S210-30, a deceptive decoy element is generated based on the analysis of the information and execution terminates.

Figure 4:
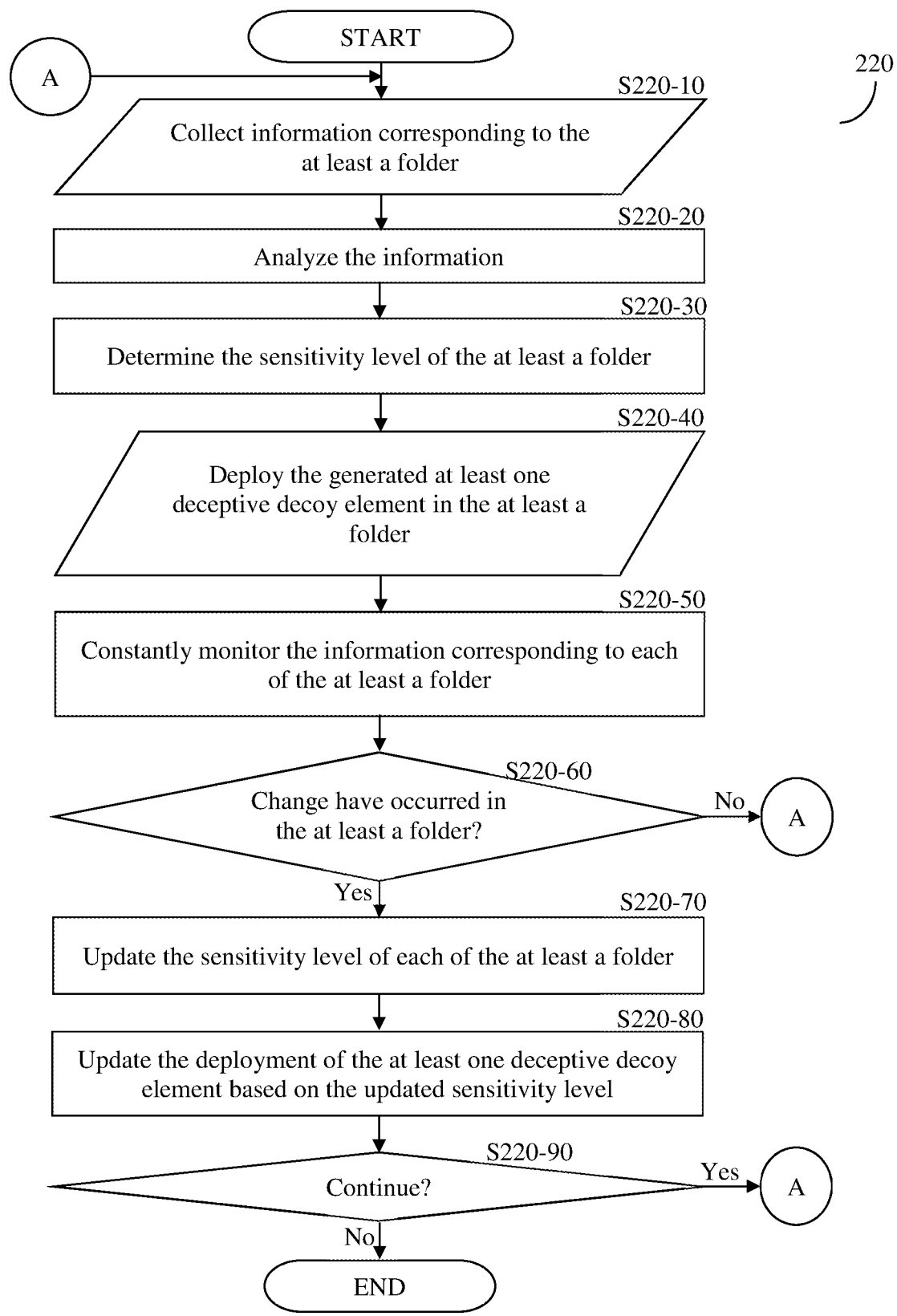
FIG. 4 is a flowchart illustrating a process for deploying the deceptive decoy elements in at least a folder according to an embodiment.

FIG. 4 is an example flowchart 220 describing a process of deploying the deceptive decoy elements in the folder according to an embodiment. At S220-10, information corresponding to the folder is collected. The folder is located in the file system of a computerized environment. The information indicates at least one of the content stored within the folder, the amount of files, types, titles, which entities handled the folder and how they accessed the folder, etc. At S220-20, the information is analyzed to determine the sensitivity level of the folder as further described herein above with respect to FIG. 1.

At S220-30, the sensitivity level of the folder is determined based on the analysis. At S220-40, the generated deceptive decoy element is deployed in the folder, based on the determined sensitivity level of the folder as further described herein above with respect to FIG. 1.

At S220-50, information corresponding to the folder is monitored. At S220-60, it is checked whether changes that require a different sensitivity level have occurred; if so, the execution continues with S220-70, otherwise, execution continues with S220-10. At S220-70, the sensitivity level of the folder is updated based on a determination that the identified changes in the folder requires the folder to have a different sensitivity level. At S220-80, the deployment of the at least one deceptive decoy element is updated based on the updated sensitivity level. That is, the deceptive decoy can be placed in a different folder of the operating system. At S220-90, it is checked whether to continue the operation; and if so execution continues with S220-10; otherwise, execution terminates.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for the deployment of deceptive decoy elements in a computerized environment to identify data leakage processes invoked by suspicious entities, comprising:
    generating at least one deceptive decoy element;
    collecting information related to each folder of a plurality of folders in the computerized environment, wherein the at least one deceptive decoy element is deployed in a first folder of the plurality of folders;
    analyzing the collected information to determine the sensitivity level of the first folder;
    monitoring the collected information to determine whether changes in the first folder have occurred, wherein the changes are related to at least the sensitivity level of the first folder;
    updating the sensitivity level of the first folder of the plurality of folders when it is determined that changes in the first folder have occurred; and
    deploying the generated at least one deceptive decoy element in a folder in a file system of the computerized environment, wherein the deployment is based on a sensitivity level of the folder, wherein the at least one deceptive decoy element is configured to provide an indication of unauthorized access upon an attempt by an unauthorized entity to access the folder.

2. The method of claim 1, further comprising:
    determining the deployment of the at least one deceptive decoy element based on the updated sensitivity level of each folder of the plurality of folders.

3. The method of claim 2, further comprising:
    analyzing the characteristics of the file.

4. The method of claim 3, further comprising:
    generating the at least one deceptive decoy element based on the analysis of the characteristics of the file.

5. The method of claim 1, further comprising:
    retrieving, from the collected information, characteristics of a file stored in the first folder.

6. The method of claim 1, wherein the at least one deceptive decoy element includes a data file simulating a regular data element.

7. A non-transitory computer readable medium having stored thereon instructions for causing a processing circuitry to execute a process for the deployment of deceptive decoy elements in a computerized environment to identify a data leakage processes invoked by suspicious entities, the process comprising:
    generating at least one deceptive decoy element;
    collecting information related to each folder of a plurality of folders in the computerized environment, wherein the at least one deceptive decoy element is deployed in a first folder of the plurality of folders;
    analyzing the collected information to determine the sensitivity level of the first folder;
    monitoring the collected information to determine whether changes in the first folder have occurred, wherein the changes are related to at least the sensitivity level of the first folder;
    updating the sensitivity level of the first folder of the plurality of folders when it is determined that changes in the first folder have occurred; and
    deploying the generated at least one deceptive decoy element in a folder in a file system of the computerized environment, wherein the deployment is based on a sensitivity level of the folder, wherein the at least one deceptive decoy element is configured to provide an indication of unauthorized access upon an attempt by an unauthorized entity to access the folder.

8. A system for deployment of deceptive decoy elements in a computerized environment to identify data leakage processes invoked by suspicious entities, comprising:
    an interface;
    a processing circuitry;
    a memory coupled to the processing circuitry, the memory contains therein instructions that when executed by the processing circuitry configure the system to:
    generate at least one deceptive decoy element;
    collecting information related to each folder of a plurality of folders in the computerized environment, wherein the at least one deceptive decoy element is deployed in a first folder of the plurality of folders;
    analyzing the collected information to determine the sensitivity level of the first folder;
    monitoring the collected information to determine whether changes in the first folder have occurred, wherein the changes are related to at least the sensitivity level of the first folder;
    updating the sensitivity level of the first folder of the plurality of folders when it is determined that changes in the first folder have occurred; and
    deploy the generated at least one deceptive decoy element in a folder in a file system of the computerized environment, wherein the deployment is based on a sensitivity level of the folder, wherein the at least one deceptive decoy element is configured to provide an indication of unauthorized access upon an attempt by an unauthorized entity to access the folder.

9. The system of claim 8, wherein the system is further configured to:
    determine the deployment of the at least one deceptive decoy element based on the updated sensitivity level of each folder of the plurality of folders.

10. The system of claim 8, wherein the system is further configured to:
    retrieve, from the collected information, characteristics of a file stored in the first folder.

11. The system of claim 10, wherein the system is further configured to:
    analyze the characteristics of the file.

12. The system of claim 11, wherein the system is further configured to:

generate the at least one deceptive decoy element based on the analysis of the characteristics of the file.

13. The system of claim 8, wherein the at least one deceptive decoy element includes a data file simulating a regular data element.

14. The method of claim 1, further comprising:
analyzing at least contents of the folder in the file system of the computerized environment;
determining the sensitivity level of the folder based on the analysis.

* * * * *